2,906,938

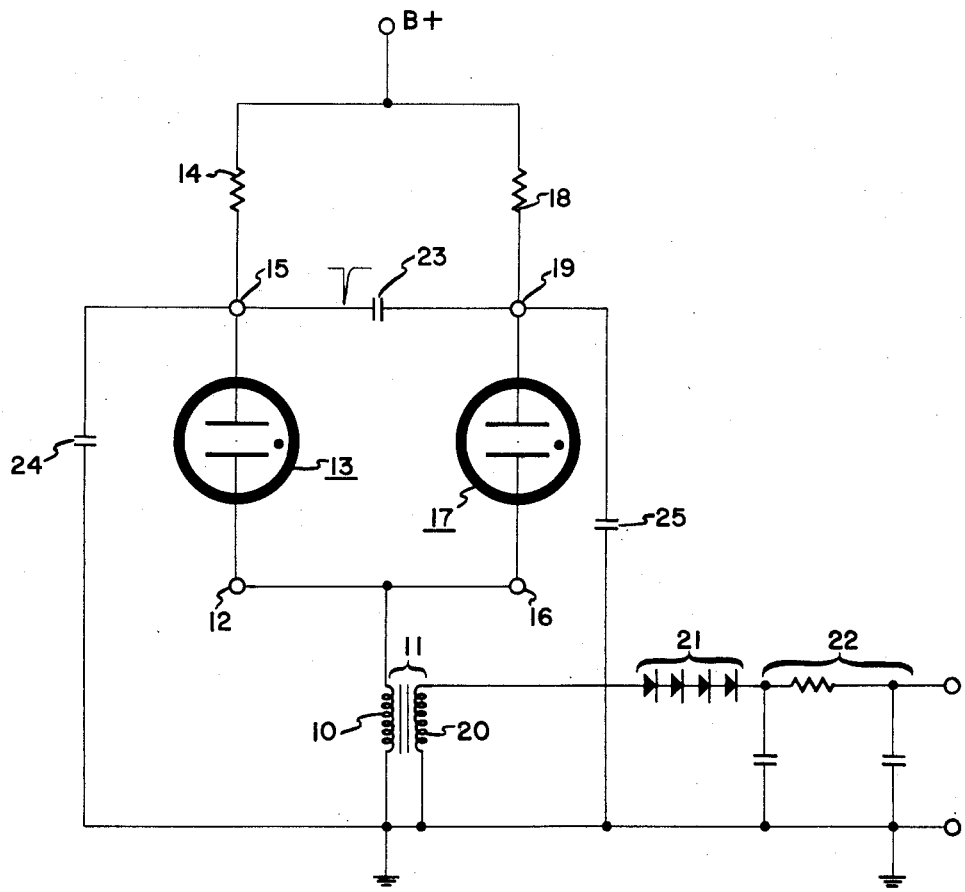

MINIATURE HIGH VOLTAGE POWER SUPPLY OR THE LIKE

Donald D. Stellmacher, Los Angeles, Calif., assignor to Hoffman Electronics Corporation, a corporation of California Application August 29, 1955, Serial No. 531,111

4 Claims. (Cl. 321—2)

This invention is related to miniature high voltage power supplies, and more particularly to an improved miniature high voltage power supply suitable for employment with portable electronic equipment requiring a high D.C. operating voltage but low operating current.

In the past, many types of miniature high voltage power supplies have been designed for use in connection with portable equipment such as ionization chambers, Geiger tubes, proportional counters, and photo-flash equipment. Invariably, these power supplies have necessarily employed hot cathode vacuum tubes with the result that they are operated at relatively low efficiency. It would, of course, be desirable for a high voltage D.C. power supply as utilized in connection with portable electronic equipment to exhibit low power consumption as, for example, by the employment of neon tubes exclusively.

Therefore, it is an object of the present invention to provide a new and useful high voltage power supply which will operate satisfactorily for supplying power to small loads.

It is a further object of the present invention to provide a new and useful high voltage, low current power supply of the miniature variety which will operate without the employment of conventional vacuum tubes.

According to the present invention, a miniature high voltage power supply consists in a novel neon tube oscillator having an output transformer element coupled to a rectifier and filter circuit portion.

The features of the present invention which are believed to be novel are set forth with particularity in the appended claims. The present invention, both as to its organization and manner of operation, together with further objects and advantages thereof, may best be understood by reference to the following description, taken in connection with the accompanying drawing, in which:

The sole figure is a schematic diagram of a miniature high voltage power supply according to the present invention.

In the sole figure primary 10 of transformer 11 is coupled between ground and terminal 12 of discharge tube 13. Resistor 14 is coupled between terminal 15 of discharge tube 13 and a source of positive voltage (B+). Terminal 12 of discharge tube 13 is also connected to terminal 16 of discharge tube 17. Resistor 18 is coupled between terminal 19 of discharge tube 17 and said source of positive voltage (B+). Secondary winding 20 of transformer 11 is coupled through a rectifier portion 21 to a filter portion 22. Capacitor 23 is coupled between terminals 15 and 19, and capacitors 24 and 25 are coupled from terminals 15 and 19, respectievly, to the aforementioned common reference potential. In practice, transformer 11 will comprise a step-up transformer having a turns ratio as large as is feasible. Rectifier portion 21 may consist of a plurality of series connected diodes, as is shown, to handle the high A.C. voltage developed across secondary 20 of transformer 11. While shown as a pi-type filter, filter portion 22 may consist of any suitable filter circuit.

The circuit shown in the sole figure operates as follows. The moment B+ voltage is applied to the circuit, capacitors 24 and 25 commence to charge and continue to do so until the ionization potential of discharge tubes 13 and 17 is reached. In practice, one of the tubes will attain its firing potential sooner than the other tube, owing to tube dissimilarities inherent in the manufacture thereof. Let it be assumed that discharge tube 13 fires first. Upon the firing of tube 13, a slight current will flow through resistor 14 to produce in conjunction with the discharge of capacitor 24 through discharge tube 13 a sharp negative pulse at terminal 15 of discharge tube 13, which negative pulse is passed through capacitor 23 to terminal 19 of discharge tube 17. This negative pulse will of course lower the voltage impressed across discharge tube 17 so as to keep this tube from achieving its firing potential. The current surge through primary 10 of transformer 11 will also tend to keep discharge tube 17 from firing, although the voltage across primary 10 will not be very high owing to the low impedance of the primary winding. The discharge of capacitor 24 through discharge tube 13 lowers the voltage across discharge tube 13. The potential across tube 13 continues to fall until the ionization extinction potential is reached at which time discharge tube 13 ceases to conduct. It is to be noted that capacitor 25 will also tend to discharge slightly through capacitor 23 and discharge tube 13 during its interval of conduction, owing to the negative pulse appearing at terminal 19; however, the voltage across capacitor 25 at the instant discharge tube 13 ceases to conduct will not be lowered to that point at which the voltage across capacitor 24 has been reduced. Hence, during the next charging interval, the voltage across capacitor 25 will rise ahead of the voltage across capacitor 24 so that this time discharge tube 17 will fire first and, owing to the current surge through discharge tube 17 resulting in the main from the discharge of capacitor 25 therethrough and the resulting steep negative pulse passing from terminal 19 through capacitor 23 to terminal 15 of discharge tube 13, discharge tube 13 will be rendered non-conductive. The moment discharge tube 17 becomes non-conductive, because of the discharge of capacitor 25 through tube 13 and primary winding 10 to ground, the cycle is repeated.

Across primary winding 10 of transformer 11, then, there will be developed a series of positive voltage spikes of very high potential followed by low-level, broad, negative pulses corresponding to intervals at which the discharge tubes continue their discharge. Rectifier portion 21 eliminates the negative half-cycles and preserves the high voltage positive half-cycles for routing through pi-type filter 22 to the output terminals.

For proper tube functioning, the primary winding 10 of transformer 11 should have a relatively low impedance so that terminals 12 and 16 will never be more than a few ohms above ground. Hence, a simple choke coil in lieu of the employment of transformer 11 would seem to be ruled out. Also, for proper filtering it is desirable that the sharp, high, voltage rises be as close together timewise as is possible; thus, the two tube relaxation oscillator as is shown might be preferable to a single neon tube relaxation oscillator. Experiment has shown also that the employment of capacitor 23 is essential to preserve uniformity of time spacing between successive positive pulses.

The above system has shown to operate very satisfactorily to produce, with a B+ battery voltage of from 60 to 100 volts, an output D.C. voltage of 1,000 to 1,500 volts for loads of a few microamperes of current. Again, this high voltage is attainable without the employment of vacuum tubes, but rather by using conventional neon discharge tubes or the like.

While a particular embodiment of the present invention has been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A relaxation oscillator including, in combination, first and second discharge tubes each having first and second terminals, first and second resistors each having a first end terminal coupled to said first terminals of said first and second discharge tubes respectively and a second end terminal adapted for coupling to a source of positive potential, an output impedance having a first end terminal coupled to said second terminals of said discharge tubes and a second end terminal adapted for coupling to a common reference potential, first and second capacitors coupled between said common reference potential and said first terminals of said first and second discharge tubes respectively, and a third capacitor coupled between said first terminals of said first and second discharge tubes.

2. Apparatus according to claim 1 in which said output impedance includes the primary winding of a transformer.

3. An electrical power supply circuit, comprising a pair of discharge tubes each having first and second electrodes, a transformer having a primary and a secondary winding, said second electrodes being connected to one end of said primary winding, a pair of resistors connected in series relation between said first electrodes, a direct-current voltage source connected between the common junction of said resistors and the other end of said primary winding, a condenser connected between each of said first electrodes and said other end of said primary winding, and a pair of output terminals connected to said secondary winding.

4. An electrical power supply circuit in accordance with claim 3, including a rectifier and a low-pass filter connected between said secondary winding and said output terminals.

References Cited in the file of this patent

UNITED STATES PATENTS

| | | |
|---|---|---|
| 2,000,685 | Andrew | May 7, 1935 |
| 2,604,589 | Burns | July 22, 1952 |
| 2,693,535 | White | Nov. 2, 1954 |